(12) United States Patent
Toshimitsu et al.

(10) Patent No.: US 8,107,993 B2
(45) Date of Patent: Jan. 31, 2012

(54) RADIO COMMUNICATION APPARATUS, METHOD AND PROGRAM

(75) Inventors: Kiyoshi Toshimitsu, Tokyo (JP);
Tomoko Adachi, Tokyo (JP); Toshihisa Nabetani, Kawasaki (JP); Tatsuma Hirano, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 395 days.

(21) Appl. No.: 12/477,598

(22) Filed: Jun. 3, 2009

(65) Prior Publication Data

US 2009/0305734 A1    Dec. 10, 2009

(30) Foreign Application Priority Data

Jun. 5, 2008   (JP) ................. 2008-148434

(51) Int. Cl.
*H04B 7/00* (2006.01)
*H04B 7/212* (2006.01)
(52) U.S. Cl. ........ 455/528; 455/509; 455/450; 370/442; 370/445; 370/910; 370/348
(58) Field of Classification Search .............. 455/552.1, 455/68, 70, 78, 88, 230, 509, 455, 464, 516, 455/528; 370/330, 338, 342–348, 445, 447, 370/459, 461, 468
See application file for complete search history.

(56) References Cited

U.S. PATENT DOCUMENTS

| | | | |
|---|---|---|---|
| 5,384,777 A * | 1/1995 | Ahmadi et al. | 370/337 |
| 6,721,302 B1 * | 4/2004 | Alastalo | 370/346 |
| 6,967,937 B1 * | 11/2005 | Gormley | 370/330 |
| 6,983,167 B2 | 1/2006 | Adachi | 370/339 |
| 7,158,501 B2 | 1/2007 | Kasami | 370/339 |
| 7,215,657 B2 | 5/2007 | Toshimitsu | 370/337 |
| 7,352,718 B1 * | 4/2008 | Perahia et al. | 370/329 |
| 7,512,096 B2 * | 3/2009 | Kuzminskiy et al. | 370/329 |
| 7,801,075 B2 * | 9/2010 | Lim et al. | 370/329 |
| 2006/0040709 A1 | 2/2006 | Adachi et al. | |

FOREIGN PATENT DOCUMENTS

JP   3822530   6/2006

OTHER PUBLICATIONS

U.S. Appl. No. 12/408,487, filed Mar. 20, 2009, Toshimitsu, et al.

(Continued)

*Primary Examiner* — Duc M Nguyen
(74) *Attorney, Agent, or Firm* — Ohlandt, Greeley, Ruggiero & Perle, L.L.P.

(57) ABSTRACT

An apparatus includes a unit receiving a first-radio signal indicating a state in which transmission by a SDMA scheme is allowed, a unit determining whether a transmission state is a first state (the SDMA scheme is available), or a second state (the SDMA scheme is unavailable), a unit transmitting a radio signal using the SDMA scheme, when it is determined that the first state continues for the first-time period, and a unit setting a third-time period, when the first state fails to continue for the first-time period, the third-time period being obtained by subtracting, from the first-time period, a second-time period ranging from when carrier sense is started to when the transmission state is determined to be the second state, wherein when the first-radio signal is received after the third-time period is set, it is determined whether the first state continues for the third-time period.

12 Claims, 10 Drawing Sheets

OTHER PUBLICATIONS

U.S. Appl. No. 12/441,571, filed Mar. 17, 2009.
U.S. Appl. No. 12/343,785, filed Dec. 24, 2008, Nakajima, et al.
U.S. Appl. No. 11/613,900, filed Dec. 20, 2006, Hideo Kasami.
U.S. Appl. No. 12/402,699, filed Mar. 12, 2009.
U.S. Appl. No. 12/364,870, filed Feb. 3, 2009.
U.S. Appl. No. 11/519,045, filed Sep. 12, 2006, Kiyoshi Toshimitsu.

* cited by examiner

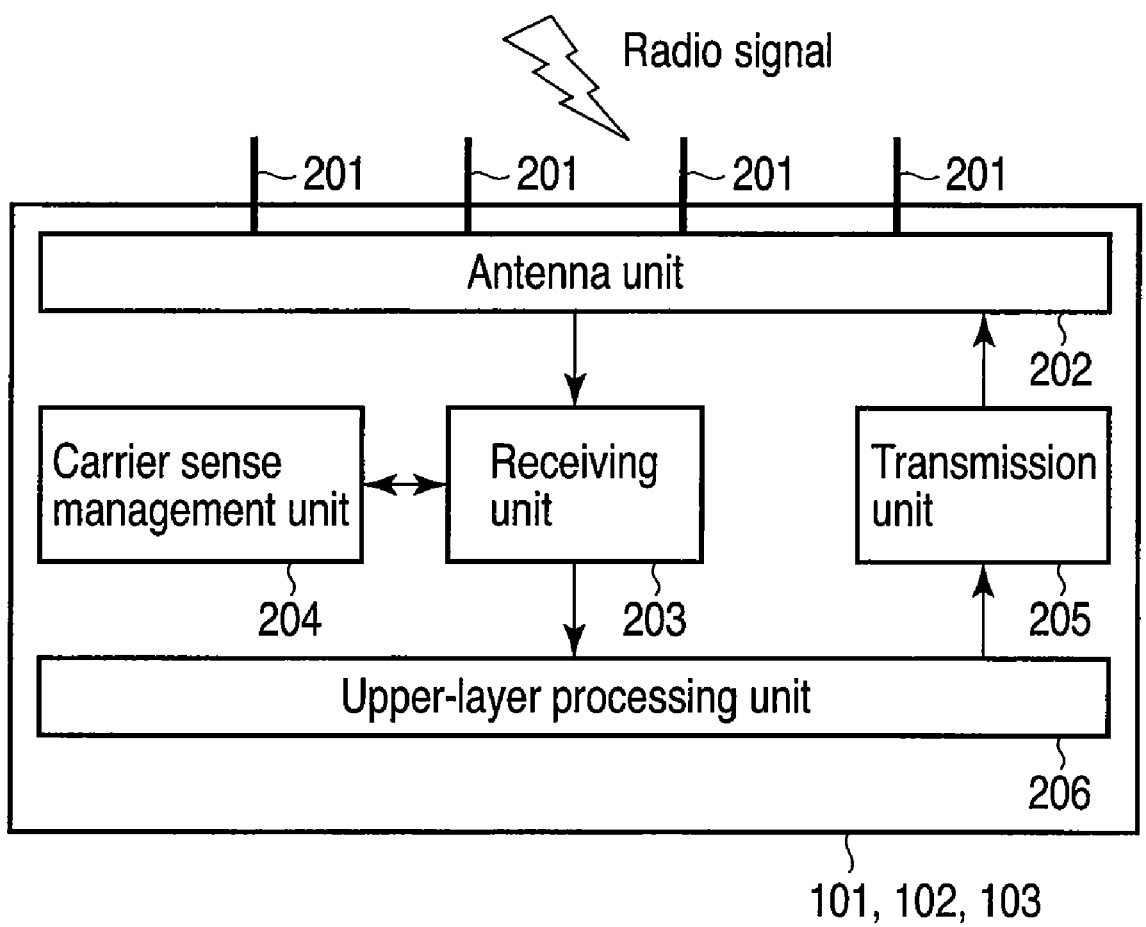
F I G. 2

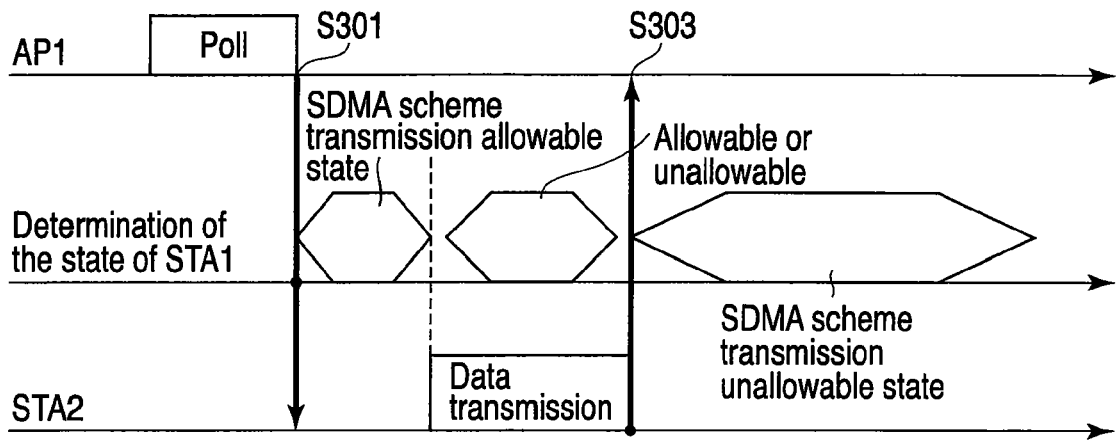
F I G. 4
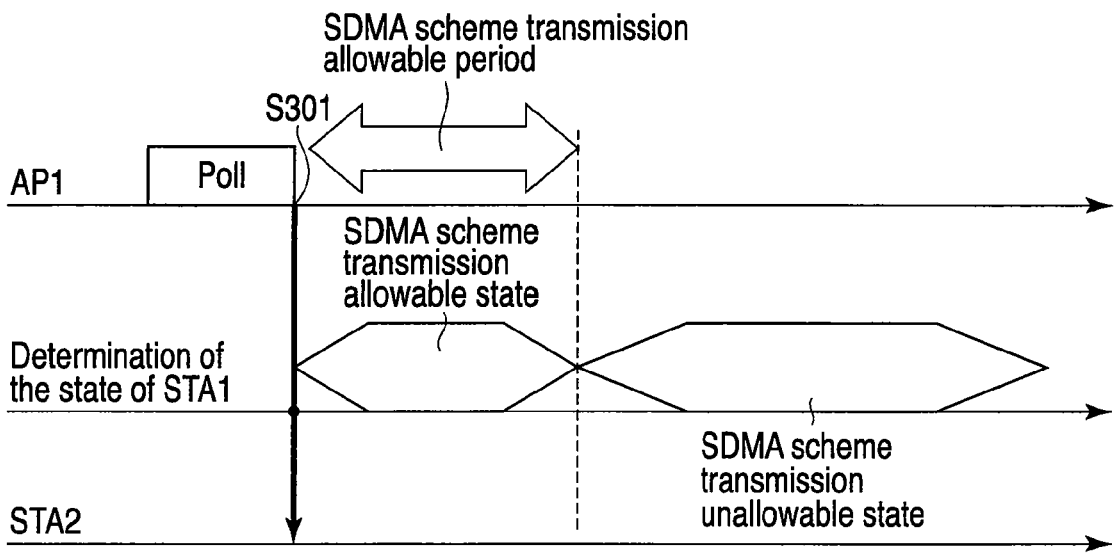
F I G. 5

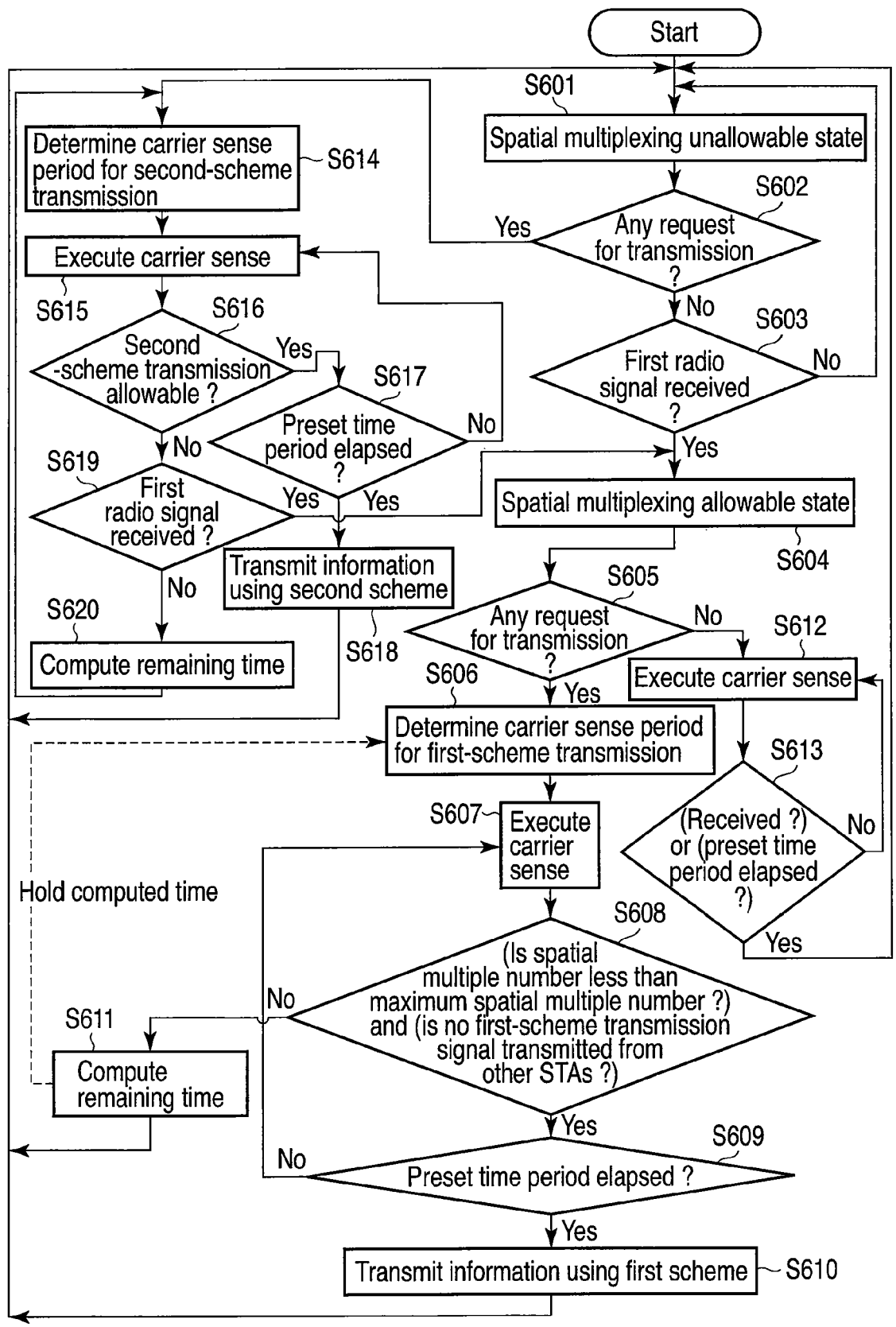
F I G. 6

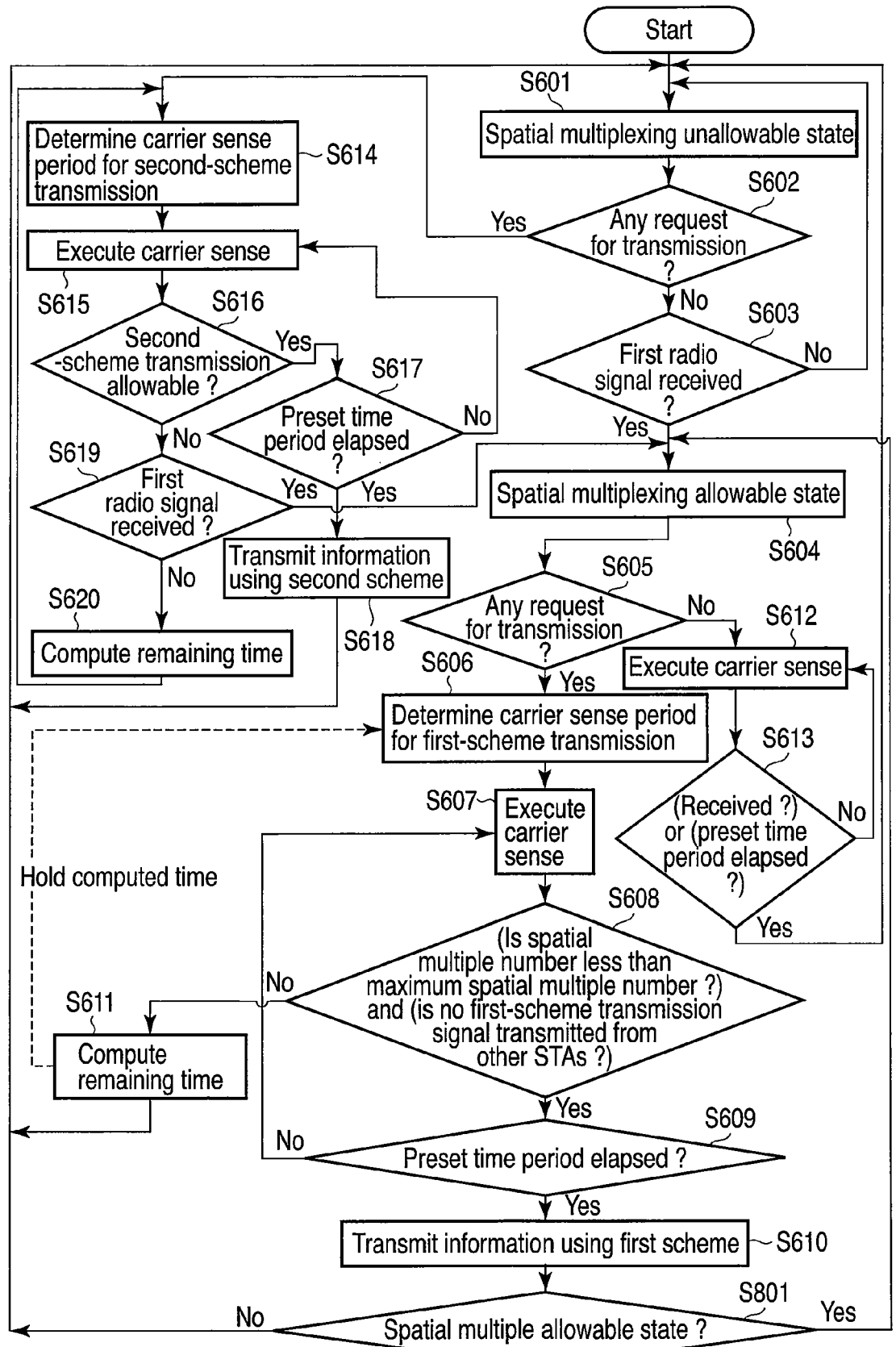
F I G. 8

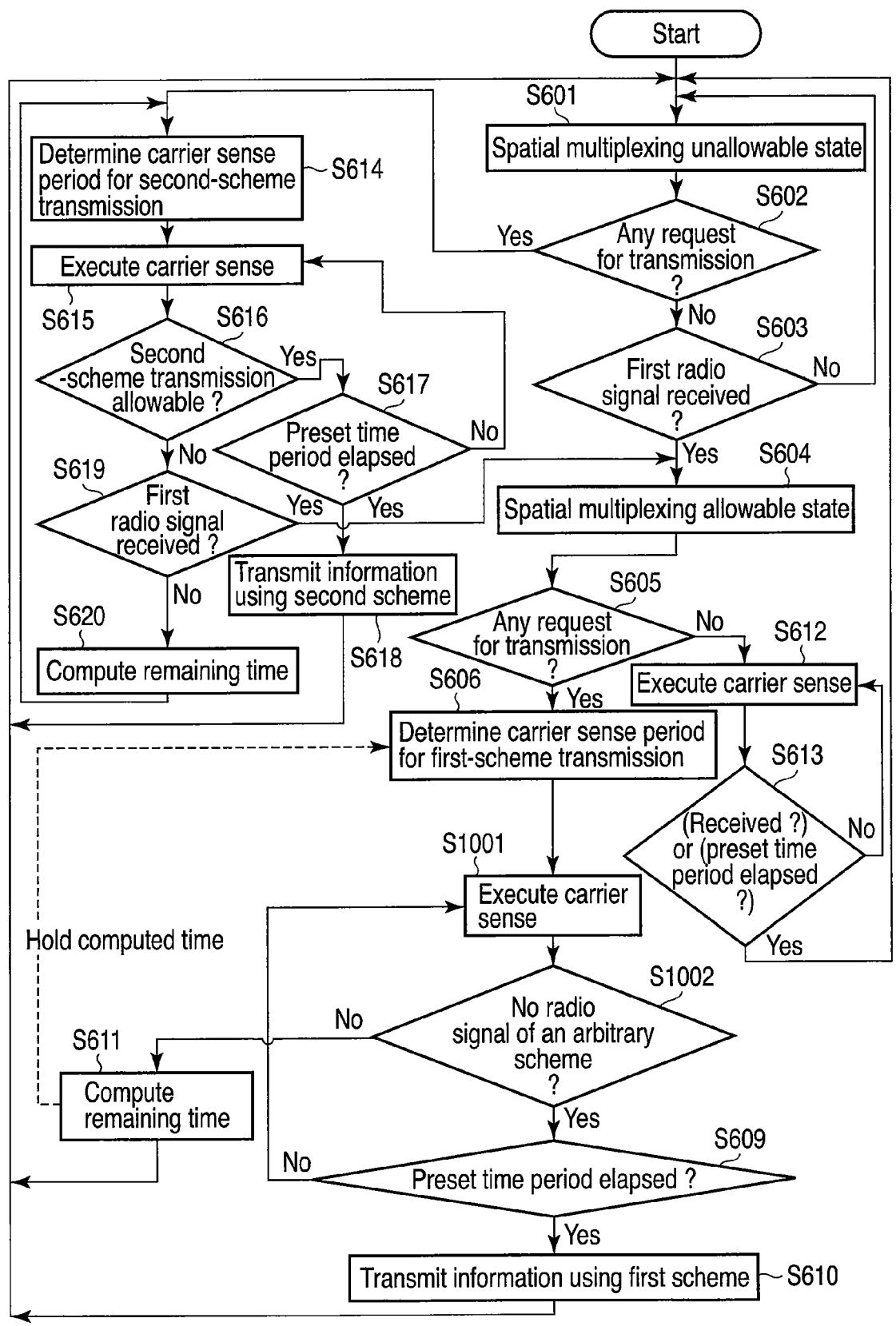
F I G. 10

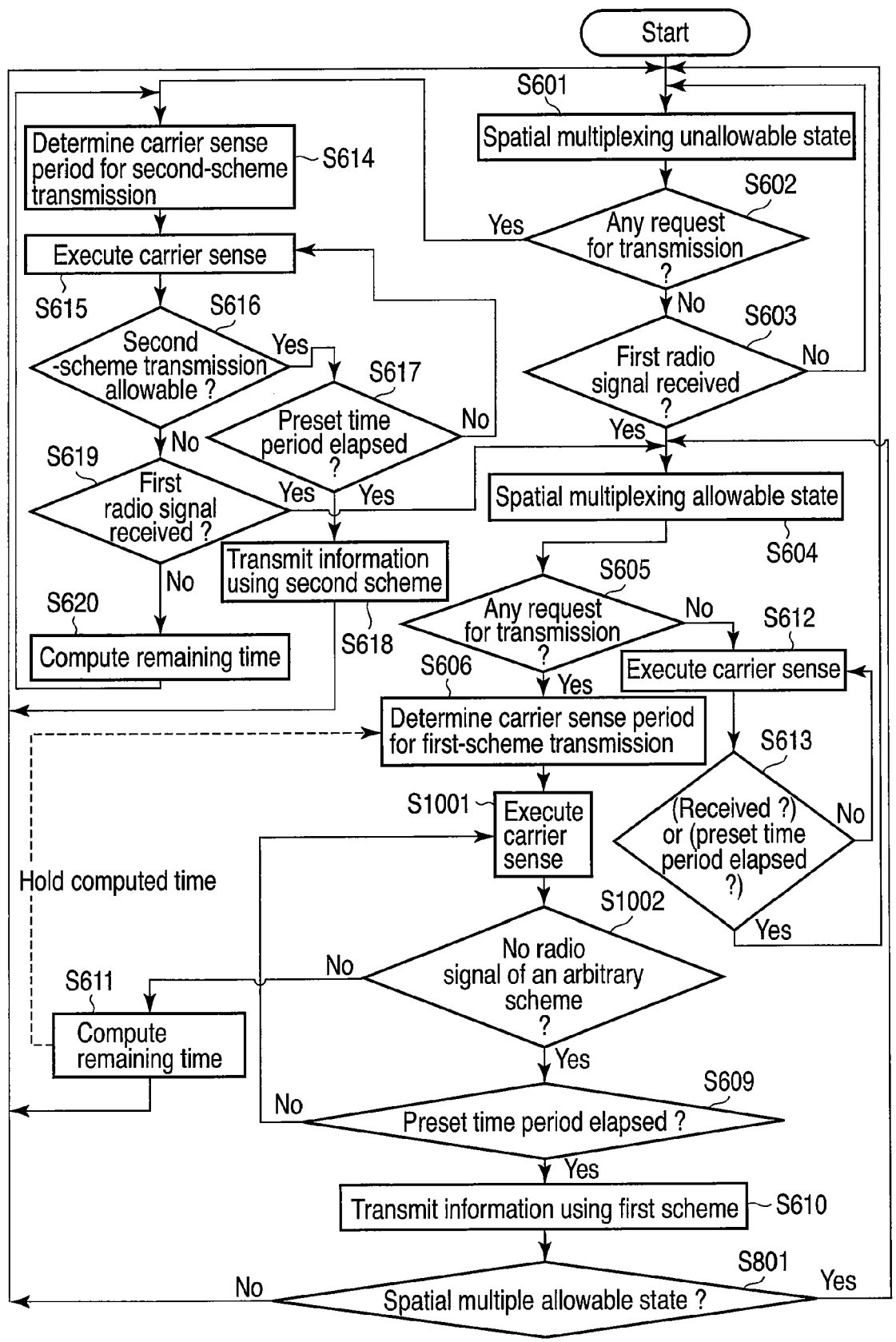
F I G. 11

RADIO COMMUNICATION APPARATUS, METHOD AND PROGRAM

CROSS-REFERENCE TO RELATED APPLICATIONS

This application is based upon and claims the benefit of priority from prior Japanese Patent Application No. 2008-148434, filed Jun. 5, 2008, the entire contents of which are incorporated herein by reference.

BACKGROUND OF THE INVENTION

1. Field of the Invention

The present invention relates to a radio communication apparatus, method and program, and more particularly, a radio communication apparatus using the Space Division Multiple Access (SDMA) scheme.

2. Description of the Related Art

Space Division Multiple Access (SDMA) is known as a multiplexing technique that enables a plurality of radio terminals to transmit data of the same frequency to a radio base station at the same point of time, thereby enhancing the efficiency of transmission. Further, there is a simple method using a polling algorithm and employed by a radio base station, the method being used to impart permission of SDMA transmission to each radio terminal (see, for example, Japanese Patent No. 3822530). In this method, each radio terminal stochastically acquires a right of access to the base station upon receiving a reported polling signal, thereby enabling simultaneous access to the base station using SDMA and suppressing, within a maximum spatial multiple number, the number of radio terminals that simultaneously access the base station (i.e., an access count).

However, in the technique disclosed in Japanese Patent No. 3822530, whenever a reported polling signal is received, a right of access is intended to be acquired with the same probability. Therefore, the right of access may not always be obtained. Although the probability of acquisition of the access right becomes stochastically equal as the number of trials of access by each terminal increases, differences may well occur in the number of acquisition times of the access right in the short term.

BRIEF SUMMARY OF THE INVENTION

According to an aspect of the invention, there is provided a radio communication apparatus comprising: a receiving unit configured to receive a first radio signal indicating a state in which transmission by a Space Division Multiple Access (SDMA) scheme is allowed; a first determination unit configured to determine, upon receiving the first radio signal, whether a transmission state is a first state in which transmission by the SDMA scheme is possible, or a second state in which the transmission by the SDMA scheme is impossible; a second determination unit configured to determine whether the first state continues for a first time period; a first transmission unit configured to transmit a radio signal using the SDMA scheme, when the second determination unit determines that the first state continues for the first time period; and a first setting unit configured to set a third time period instead of the first time period, when the second determination unit determines that the first state fails to continue for the first time period, the third time period being obtained by subtracting, from the first time period, a second time period ranging from when the carrier sense is started to when the transmission state is determined to be the second state, wherein when the receiving unit receives the first radio signal after the third time period is set, the second determination unit determines whether the first state continues for the third time period.

According to another aspect of the invention, there is provided a radio communication apparatus comprising: a receiving unit configured to receive a first radio signal indicating a state in which transmission by a Space Division Multiple Access (SDMA) scheme is allowed; a first determination unit configured to determine, upon receiving the first radio signal, whether a transmission state is a first state in which there are no radio signals of arbitrary communication schemes, or a second state in which there is a radio signal of a communication scheme; a second determination unit configured to determine whether the first state continues for a first time period; a first transmission unit configured to transmit a radio signal using the SDMA scheme, when the second determination unit determines that the first state continues for the first time period; and a first setting unit configured to set a third time period instead of the first time period, when the second determination unit determines that the first state fails to continue for the first time period, the third time period being obtained by subtracting, from the first time period, a second time period ranging from when the carrier sense is started to when the transmission state is determined to be the second state, wherein when the receiving unit receives the first radio signal after the third time period is set, the second determination unit determines whether the first state continues for the third time period.

According to yet another aspect of the invention, there is provided a radio communication apparatus comprising: an estimation unit configured to estimate number of first radio communication apparatuses having requests for transmission and included in second radio communication apparatuses, when the second radio communication apparatuses receive a first radio signal indicating a state in which transmission by a Space Division Multiple Access (SDMA) scheme is allowed; a setting unit configured to set an upper limit of a random number generated by each of the first radio communication apparatuses when each first radio communication apparatus computes a carrier sense time period, the larger the random number, the longer the carrier sense time period, the upper limit being set to cause a product of the number of the first radio communication apparatuses and an inverse number of the upper limit to be smaller than a maximum spatial multiple number determined in the SDMA scheme by a value falling within a threshold value range; and a transmission unit configured to transmit the first radio signal including the upper limit to third radio communication apparatuses belonging to a network and including the first radio communication apparatuses.

BRIEF DESCRIPTION OF THE SEVERAL VIEWS OF THE DRAWING

FIG. 2 is a block diagram illustrating a radio communication apparatus (radio terminal) employed in the first and second embodiments;

FIG. 4 is a view illustrating a first case where it is determined that a transmission state has been shifted from an SDMA scheme allowable state to an SDMA scheme unallowable state;

FIG. 5 is a view illustrating a second case where it is also determined that the mode has been shifted from the SDMA scheme allowable mode to the SDMA scheme unallowable mode;

FIG. 6 is a flowchart illustrating an operation example performed by each radio terminal in the first embodiment to realize the first example of transmission;

FIG. 8 is a flowchart illustrating an operation example performed by each radio terminal in the first embodiment to realize the second example of transmission;

FIG. 10 is a flowchart illustrating an operation example performed by each radio terminal in the second embodiment to realize the first example of transmission; and FIG. 11 is a flowchart illustrating an operation example performed by each radio terminal in the second embodiment to realize the second example of transmission.

DETAILED DESCRIPTION OF THE INVENTION

Referring to the accompanying drawings, radio communication apparatuses, method and programs according to embodiments of the invention will be described in detail. In the embodiments, like reference numbers denote like elements, and duplication of explanation will be avoided.

Figure 1:
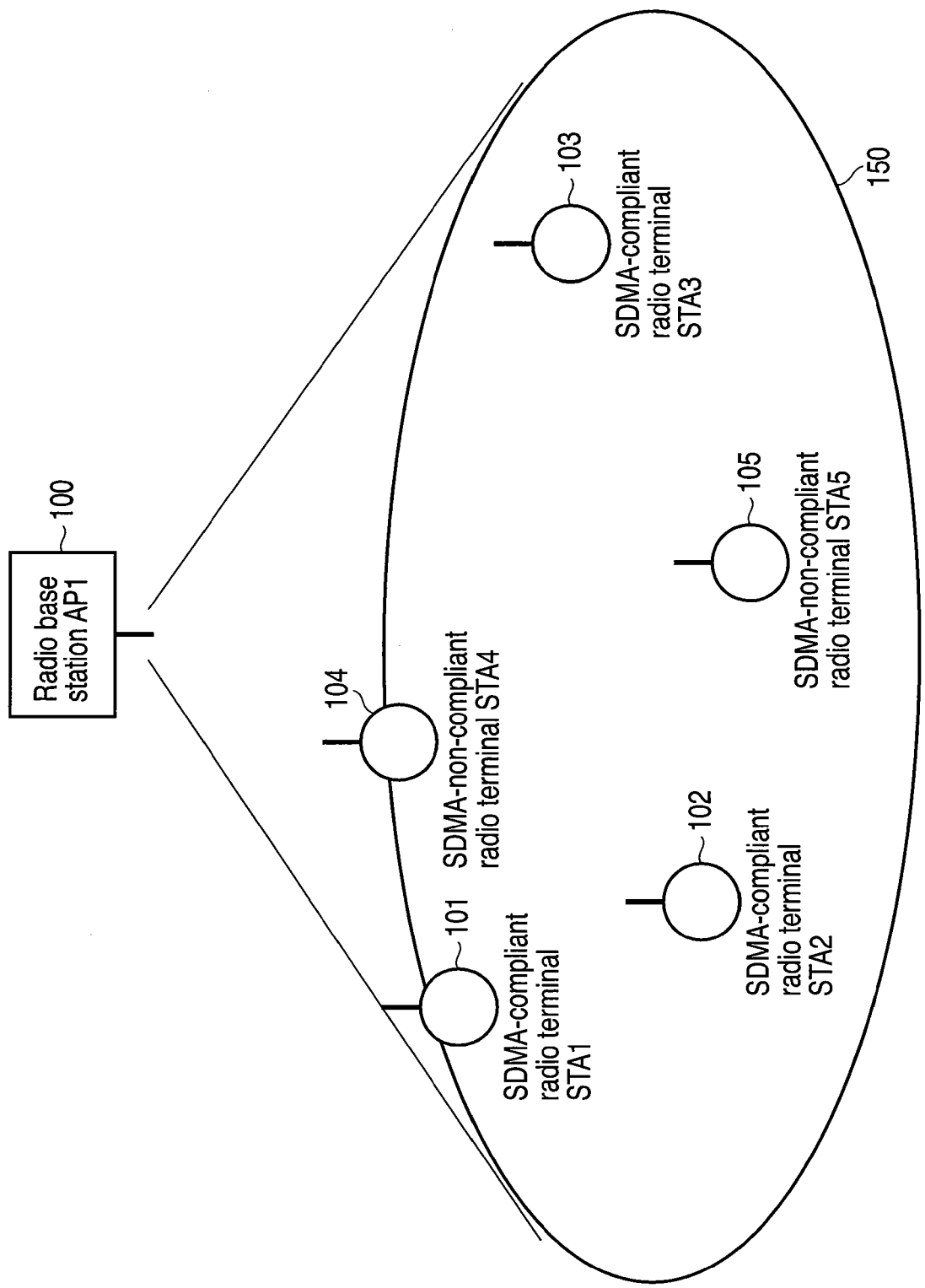
FIG. 1 is a view illustrating the positional relationship between a single radio base station and a plurality of radio terminals, employed in first and second embodiments.

Referring first to FIG. 1, a description will be given of the positional relationship between a radio base station AP1 and radio terminals STA1 and STA5 employed in the embodiments.

A radio base station AP1 100 and radio terminals STA1 101 to STA5 105 belong to the same network. The radio terminals STA1 101 to STA3 103 are SDMA-compliant radio terminals that can perform SDMA-scheme transmission, and the radio terminals STA4 104 and STA5 105 are SDMA-non-compliant radio terminals that cannot perform SDMA-scheme transmission. Accordingly, the radio terminals STA1 101 to STA3 103 perform transmission using the SDMA scheme when this type of transmission is possible, and perform conventional transmission that does not use the SDMA scheme, when the SDMA-scheme transmission is impossible. In contrast, the radio terminals STA4 104 and STA5 105 perform only the conventional transmission that does not use the SDMA scheme, since they cannot perform the SDMA-scheme transmission. Therefore, if the radio base station AP1 100 sets a certain period of time as an SDMA-scheme transmission period, the radio terminals STA4 104 and STA5 105 do not perform transmission.

The radio communication apparatuses, method and programs of the embodiments enable a radio communication system using the SDMA scheme to realize fairer radio access.

FIRST EMBODIMENT

Referring now to FIG. 2, a radio communication apparatus according to a first embodiment will be described. This radio communication apparatus corresponds to each of the radio terminals STA1 101 to STA3 103.

The radio communication apparatus of the first embodiment comprises antennas 201, an antenna unit 202, a receiving unit 203, a carrier sense management unit 204, a transmission unit 205 and an upper-layer processing unit 206.

The antenna unit 202 receives radio signals via the antennas 201. The antenna unit 202 may execute antenna control for controlling antenna directivity when receiving or transmitting a radio signal. The receiving unit 203 executes carrier sense of a radio channel and receiving processing of a radio signal. The carrier sense management unit 204 executes carrier sense of a radio channel, and executes, based on the result of carrier sense, a determination as to whether transmission using the SDMA scheme is possible, a determination as to whether transmission using a non-SDMA scheme is possible, management of a backoff number, etc. The transmission unit 205 executes transmission processing of a radio signal. The upper-layer processing unit 206 enables, for example, transmission of data between the upper layer of the terminal itself and the receiving unit 203 or transmission unit 205.

First Example

Referring then to the transmission sequence of FIG. 3, a description will be given of a first example of transmission between the radio base station AP1 100 and the radio terminals STA1 101 to STA5 105.

The radio base station AP1 100 transmits, to each radio terminal, a radio signal for allowing each radio terminal to execute SDMA scheme transmission (step S301). In the embodiment, the radio signal is called a polling signal. The polling signal is a signal for allowing the SDMA scheme transmission, and includes destination address information and information indicating a period of time in which the SDMA scheme transmission is allowed. As the destination address information, a broadcast address, a multicast address, or a plurality of unicast addresses are set. However, if, for example, all radio terminals of the network shown in FIG. 1 are beforehand informed that the destination address information of a polling signal transmitted from the radio base station AP1 100 is indicated by a broadcast address, the destination address information is not necessary. The period in which the SDMA scheme transmission is allowed is set based on the maximum value of backoff periods, described later. If, for example, the maximum value of the backoff number corresponds to a contention window (CW), described later, the SDMA-scheme transmission allowable period is set to a value of short inter-frame space (SIFS)+SlotTime×CW, or a value slightly higher than it.

The data items to be transmitted have different QoS (Quality of Service) types. If there exist a plurality of CWs, the period, in which SDMA scheme transmission is allowed, may be set in consideration of the maximum value of the CWs and in accordance with the priority of the QoS type of the to-be-transmitted data. Further, when the QoS type of each frame to be transmitted by the SDMA scheme transmission is designated using a polling signal, the SDMA-scheme transmission allowable period may be set in units of polling signals. For instance, the radio base station AP1 100 may beforehand inform each of the radio terminals STA1 101 to STA3 103 of CW information, such as CW for voice transmission (QoS1) and CW for data transmission (QoS2), using for example, a beacon signal, and may designate QoS1 or QoS2 in a polling signal. Each of the radio terminals STA1 101 to STA3 103 receives the polling signal, and prepares to transmit data of the designated QoS. If the polling signal designates QoS1, each of the radio terminals STA1 101 to STA3 103 prepares to execute voice communication using a CW for voice transmission. In this case, data communication is impossible.

Each of the radio terminals STA1 101 to STA3 103 receives, from the radio base station AP1 100, a polling signal for allowing SDMA scheme transmission (step S301). The radio terminals STA4 104 and STA5 105 also receive the polling signal (step S301), and stop transmission during the SDMA-scheme transmission allowable period designated by the polling signal.

In the radio terminals STA1 101 to STA3 103, the receiving unit 203 executes destination address checking on the received polling signal. If the destination address information of the polling signal is a unicast address indicating the terminal having received the signal, or a broadcast address, the receiving unit 203 determines that the signal is addressed thereto and continues the execution of reception processing. Namely, if the destination address information of the polling signal for allowing SDMA scheme transmission is the broadcast address, the carrier sense management unit 204 executes carrier sense for a preset period of time. As is determined under, for example, IEEE 802.11e, the carrier sense period is set to, for example, the sum (called AIFS) of backoff periods each determined from a preset SIFS period and a random number. The backoff period is a value (StlotTime×N) obtained by multiplying a fixed period (SlotTime), called a slot length, by a backoff number (N) determined based on a random number. The maximum number of random numbers will hereinafter be referred to as a contention window size (CW). N is an integer ranging from 0 to CW. The CW is determined by the radio base station AP1 100.

The CW will now be described. The value of the CW depends on the maximum spatial division multiple number (T) determined by the SDMA scheme, and the number n of radio terminals that request transmission upon receiving a polling signal. To be more specific, $T \geq n/CW$. It is desirable that n/CW is slightly lower than T. For example, the radio base station AP1 100 sets the n/CW lower than T by a value falling within a certain threshold value range. If the radio base station AP1 100 can detect the number n of radio terminals that request transmission upon receiving a polling signal, it sets a CW to satisfy $T \geq n/CW$. In this case, if each radio terminal has a request to execute transmission, it informs the radio base station AP1 100 of the request. Further, the radio base station AP1 100 may detect the number N of radio terminals belonging to its network, thereby setting a function f that approximately satisfies f(N)=n, estimating n from N, and setting a CW that satisfies N and $T \geq f(N)/CW$. The number N of radio terminals that belong to the network of the radio base station AP1 100 is set, for example, to the number of radio terminals that are included in the network and have being accessing the radio base station so far, or to the number of radio terminals that were accessing the base station during a certain period. In general, when the number of radio terminals belonging to the same network is increased, the radio base station AP1 100 increases the number of CWs to enable radio terminals close to the maximum spatial multiple number to execute transmission using spatial multiplexing, thereby enhancing the efficiency of transmission.

When each of the radio terminals STA1 101 to STA3 103 has a request to transmit data, its carrier sense management unit 204 generates a random number lower than a preset CW to obtain a backoff period (SIFS+SlotTime×N), and executes carrier sense of a radio channel during the period to check whether SDMA scheme transmission is possible in the radio channel (step S302). For instance, the carrier sense management unit 204 measures currently received power. The carrier sense management unit 204 determines that SDMA scheme transmission is possible, if the measured power is not higher than a threshold value, and determines that SDMA scheme transmission is impossible, if the measured power is higher than the threshold value. Alternatively, the carrier sense management unit 204 may measure a current spatial multiple number by carrier sense, thereby determining that SDMA scheme transmission is possible, if the measured spatial multiple number is less than a maximum spatial multiple number, and determining that SDMA scheme transmission is impossible, if the measured spatial multiple number is not less than the maximum spatial multiple number. The term "spatial multiple number" means the number of radio signals simultaneously transmitted by the SDMA scheme. When the carrier sense management unit 204 detects that SDMA scheme transmission cannot be executed during the backoff period, it holds and stores the remaining backoff number. The maximum spatial multiple number is predetermined by the SDMA scheme, and is reported by the radio terminals STA1 101 to the radio terminals STA1 101 to STA5 105, using a polling signal or a beacon signal.

Figure 3:
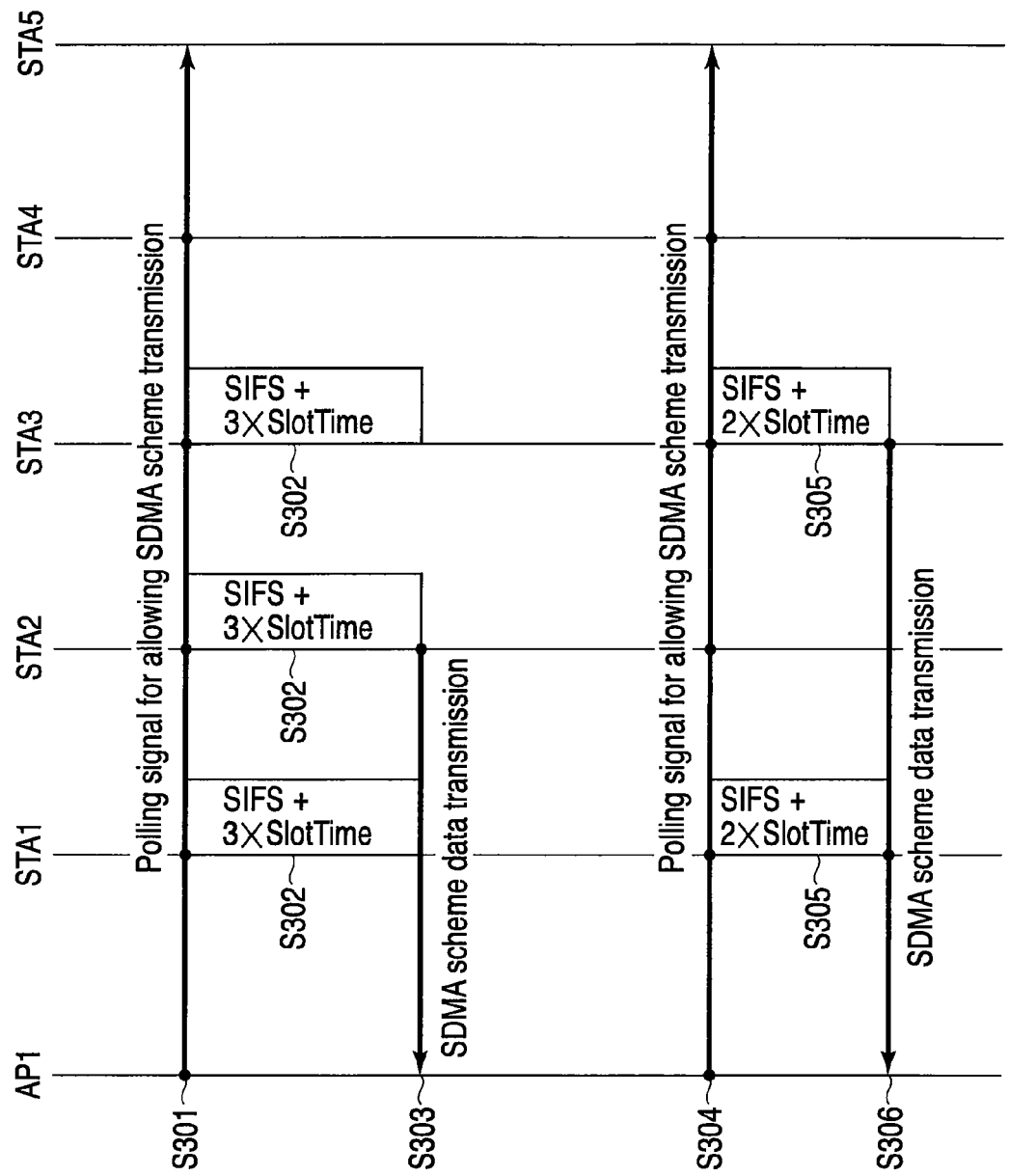
FIG. 3 is a transmission sequence as a first example of transmission executed between the radio base station and the radio terminals in the first embodiment.

Assume that in the example shown in FIG. 3, the backoff numbers obtained by the radio terminals STA1 101 to STA3 103 based on respective initial random numbers are 5, 3 and 5, respectively. In this case, in the radio terminals STA1 101 and STA3 103, the backoff period is SIFS+SlotTime×5, while in the radio terminal STA2 102, it is SIFS+SlotTime×3. Since, in this case, the backoff period of the radio terminal STA2 102 is shorter than that of the other radio terminals STA1 101 and STA3 103, it is strongly possible that the radio terminal STA2 102 can execute quicker transmission. In the example of FIG. 3, although it is determined from the result of carrier sense executed by the carrier sense management unit 204 that the radio terminals STA1 101 and STA3 103 can execute SDMA scheme transmission during a period of SIFS+SlotTime×3, it is determined later that the radio terminal STA2 102 has executed SDMA scheme transmission and hence the radio terminals STA1 101 and STA3 103 cannot execute SDMA scheme transmission. Therefore, the radio terminals STA1 101 and STA3 103 do not execute SDMA scheme transmission, and hold 2 (=5−3) as the remaining backoff number. After that, if the receiving unit 203 of each of the radio terminals STA1 101 and STA3 103 again receives a polling signal that allows SDMA scheme transmission and includes a broadcast address as destination address information (step S304), the carrier sense management unit 204 does not again generate a random number, and executes carrier sense, using, as a backoff period, SIFS+SlotTime×2 obtained based on the held backoff number (step S305).

If the backoff number is set as the above, it is more strongly possible that a radio terminal, which has failed in executing transmission in response to a first polling signal for allowing SDMA scheme transmission, can execute SDMA scheme transmission when receiving a subsequent polling signal, since the current backoff number is smaller than the last one and accordingly the current carrier sense period is shorter than the last one. In other words, the greater the number of times a certain radio terminal receives the polling signal for allowing SDMA scheme transmission, the greater the priority of connection of the terminal to the radio base station. In the example of FIG. 3, the backoff number of the radio terminals STA1 101 and STA3 103 corresponding to the first polling signal is 5, and that corresponding to the second polling signal is 3. Since thus, the carrier sense period required for transmission becomes smaller, the possibility of executing SDMA scheme transmission is stronger upon receiving the second polling signal than upon receiving the first polling signal.

If the radio terminals STA1 101 and STA3 103 each determine as a result of carrier sense that any other radio terminals do not execute SDMA scheme transmission, and if the spatial multiple number is less than the maximum spatial multiple number, they transmit data using the SDMA scheme (S306).

Referring then to FIG. 6, a description will be given of an algorithm example used to determine whether the radio terminals STA1 101 to STA3 103 should switch the transmission scheme between the SDMA scheme and the non-SDMA scheme. Step S613 will be described later with reference, in particular, to FIGS. 4 and 5.

If the current period falls outside the SDMA-scheme transmission allowable period indicated by a polling signal (step S601), the upper-layer processing unit 206 of a radio terminal determines whether the radio terminal has a request to transmit data (step S602). If it is determined at step S602 that there is no such request, it is determined whether the receiving unit 203 has received a first radio signal (polling signal) (step S603). If it is determined at step S603 that no polling signal is received, the program returns to step S601, where it is determined that the current period falls outside the SDMA-scheme transmission allowable period. If it is determined at step S603 that a polling signal has been received, the upper-layer processing unit 206 determines that the current period falls within the SDMA-scheme transmission allowable period (step S604), and then determines whether there is a request for transmission (step S605).

If it is determined at step S605 that there is a request for transmission, the carrier sense management unit 204 determines a period of carrier sense for executing transmission using a first scheme (SDMA scheme) (step S606). Namely, the radio terminal determines the above-mentioned backoff number (N). The receiving unit 203 executes carrier sense only during the carrier sense period determined at step S606 (step S607). Using the result of carrier sense, the carrier sense management unit 204 determines whether SDMA scheme transmission is possible. Specifically, the carrier sense management unit 204 determines whether the spatial multiple number is less than the maximum spatial multiple number, and whether there is a signal transmitted from any other radio terminal using the SDMA scheme (step S608). In this case, if the spatial multiple number is less than the maximum spatial multiple number, and if there is no SDMA scheme signal transmitted from any other radio terminal, the carrier sense management unit 204 determines that SDMA scheme transmission is possible. If it is determined at step S608 that the spatial multiple number is less than the maximum spatial multiple number, and that there is no SDMA scheme signal transmitted from any other radio terminal, the carrier sense management unit 204 determines whether the carrier sense period determined at step S606 has elapsed (step S609). If it is determined that the carrier sense period determined has not yet elapsed, the program returns to step S607, where carrier sense is continued. In contrast, if it is determined that the carrier sense period has elapsed, the transmission unit 205 transmits data using the SDMA scheme (step S610), and the program returns to step S601.

If it is determined at step S608 that the spatial multiple number is not less than the maximum spatial multiple number, or that there is a signal transmitted from any other radio terminal using the SDMA scheme, the carrier sense management unit 204 computes a remaining period (step S611), and holds a numerical value corresponding to the remaining period. After that, the program returns to step S601. The remaining period is obtained by subtracting an actual carrier sense period from a set carrier sense period. The backoff number indicates the remaining period.

If it is determined at step S605 that there is no request for transmission, the carrier sense management unit 204 executes carrier sense (step S612), and determines whether there is a signal from any other radio terminal, or whether the SDMA scheme transmission allowable period has elapsed (step S613). If it is determined at step S613 that there is no signal transmitted from any other radio terminal, and that the SDMA-scheme transmission allowable period has not yet elapsed, the program returns to step S612, whereas if it is determined at step S613 that there is a signal transmitted from another radio terminal, or that the SDMA-scheme transmission allowable period has elapsed, the program returns to step S601.

Referring then to FIGS. 4 and 5, a process example performed at step S613 will be described. If another radio terminal (STA2) has executed SDMA scheme transmission in response to a polling signal (FIG. 4), or if no SDMA scheme transmission has been executed in response to the polling signal and the SDMA-scheme transmission allowable period has elapsed (FIG. 5), a radio terminal (STA1), which has no request to execute SDMA scheme transmission (No at step S605) upon receiving the polling signal (Yes at step S603), determines that the current state has shifted from an SDMA-scheme transmission allowable state to an SDMA-scheme transmission unallowable state (step S601), and executes non-SDMA scheme transmission until the SDMA scheme transmission is allowed again (step S604). Thus, determination as to switching between the SDMA-scheme transmission period and the non-SDMA-scheme transmission period is executed. How to regard the current state as the SDMA-scheme transmission allowable state or as the SDMA-scheme transmission unallowable state shown in FIG. 4 depends upon the method of carrier sense. As aforementioned, if carrier sense is executed only based on received power, the state in which a radio terminal STA2 is executing transmission can be regarded as the SDMA-scheme transmission unallowable state. However, the same state can also be regarded as the SDMA-scheme transmission allowable state, if the determination method, in which SDMA scheme transmission is allowed when the spatial multiple number is less than the maximum spatial multiple number, is employed.

If it is determined at step S602 that there is a request for transmission, the carrier sense management unit 204 determines a period of carrier sense executed for transmission based on a second scheme (i.e., the non-SDMA scheme) (step S615). This carrier sense period normally differs from that determined at step S606. The receiving unit 203 executes carrier sense during the carrier sense period determined at step S614 (step S615). Based on the result of carrier sense, the carrier sense management unit 204 determines whether non-SDMA scheme transmission is possible (step S616). It is determined at step S616 that non-SDMA scheme transmission is possible, the carrier sense management unit 204 determines whether the carrier sense period determined at step S614 has elapsed (step S617). If it is determined that the carrier sense period has not yet elapsed, the program returns to step S615, where carrier sense is continued. In contrast, if it is determined that the carrier sense period has elapsed, the transmission unit 205 transmits data using the non-SDMA scheme (step S618), followed by the program returning to step S601.

If it is determined at step S616 that non-SDMA scheme transmission is impossible, the receiving unit 203 determines whether a first radio signal (polling signal) has been received (step S619). If it is determined at step S619 that no polling signal is received, the carrier sense management unit 204 computes a remaining period (step S620), and holds the remaining period. The program returns to step S614, where the remaining period is determined to be the carrier sense period.

The method ranging from steps S614 to S620 is just an example, and another algorithm may be employed instead of this method.

Further, although in the above embodiment, the destination address information of the polling signal is set as a broadcast address, it may be a multi-cast address including the radio terminal having received the polling signal, or may include a plurality of unicast addresses. In the case of unicast addresses, the polling signal is distributed, for example, firstly to the radio terminals STA1 101 to STA5 105, then to radio terminals STA6 to STA10 (not shown), and then to radio terminals STA11 to STA15 (not shown).

However, it should be noted that the embodiment brings out an advantage when the number of terminals designated by a multicast address or a plurality of unicast addresses is greater than the maximum spatial multiple number. This is because the backoff control of the embodiment has been developed to control the number of spatially multiplexed terminals designated by the multicast address or unicast addresses, when it is greater than the maximum spatial multiple number. If the number of spatially multiplexed terminals designated by the multicast address or unicast addresses is less than the maximum spatial multiple number, it is more efficient for all designated terminals to execute communication, than to limit, by backoff control, the number of terminals which execute communication.

Second Example

Figure 7:
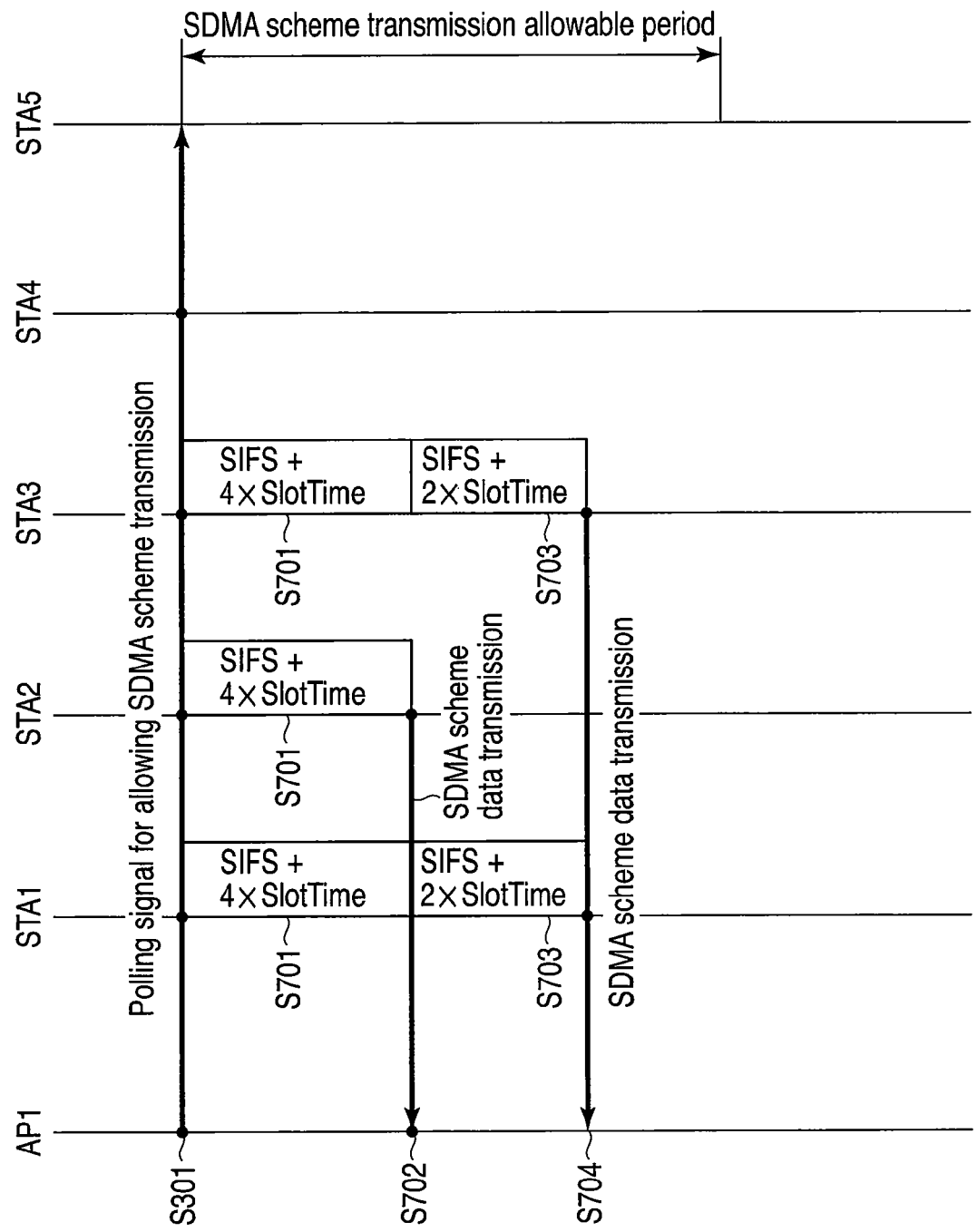
FIG. 7 is a transmission sequence as a second example of transmission executed between the radio base station and the radio terminals in the first embodiment.

Referring then to FIG. 7, a description will be given of a second example of transmission between the radio base station AP1 100 and the radio terminals STA1 101 to STA5 105. In the example of FIG. 3, SDMA scheme transmission is executed once (step S303 or S306) upon receiving a polling signal once (step S301 or S304). In contrast, in the second example, SDMA scheme transmission is executed a plurality of times (steps S701 and S704) upon receiving a polling signal once (step S301). Also in the second example, information indicating the SDMA-scheme transmission allowable period is added to the polling signal. If it is determined, as a result of carrier sense (steps S701 and S703) during this period, that SDMA scheme transmission is possible, frame transmission using the SDMA scheme is executed. For instance, carrier sense is executed after receiving a polling signal. At this time, supposing that the backoff number is 6, SDMA scheme transmission is possible during the period of SIFS+SlotTime×4. After that, if it is determined that SDMA scheme transmission is impossible because, for example, the radio terminal (STA2) is executing transmission, the remaining backoff number 2 is kept. Carrier sense is continued for the SDMA-scheme transmission allowable period added to the polling signal. Before the SDMA-scheme transmission allowable period elapses, if it is determined that the transmission by another radio terminal has finished, that SDMA scheme transmission is still possible, and that SDMA scheme transmission is possible during the period of SIFS+SlotTime×2 (corresponding to the above-mentioned remaining backoff number), frame transmission is executed using the SDMA scheme (step S704). Compared to the first example of FIG. 3, multiplexing is facilitated and overhead related to the transmission of the polling signal is reduced, therefore the throughput characteristic is improved. Further, in general, the SDMA-scheme transmission allowable period is longer in the second example than in the first example.

Referring to FIG. 8, a description will be given of an algorithm example, employed in the radio terminals STA1 101 to STA3 103, for determining switching of the transmission scheme between the SDMA scheme and the non-SDMA scheme.

The switching determination algorithm in the second example is substantially the same as that of the first example. They only differ in that the second example has a step, after step S610, of determining whether a spatial multiplexing allowable state is assumed. In the second example, if it is determined at step S610 that the carrier sense period has elapsed, the transmission unit 205 transmits data using the SDMA scheme, and after that, the carrier sense management unit 204 determines whether the current state is a spatial multiplexing allowable state within the SDMA-scheme transmission allowable period (step S801). If it is determined that the current state is the spatial multiplexing allowable state, the program returns to step S604, while if it is determined that the current state is not the spatial multiplexing allowable state, the program returns to step S601.

Figure 9:
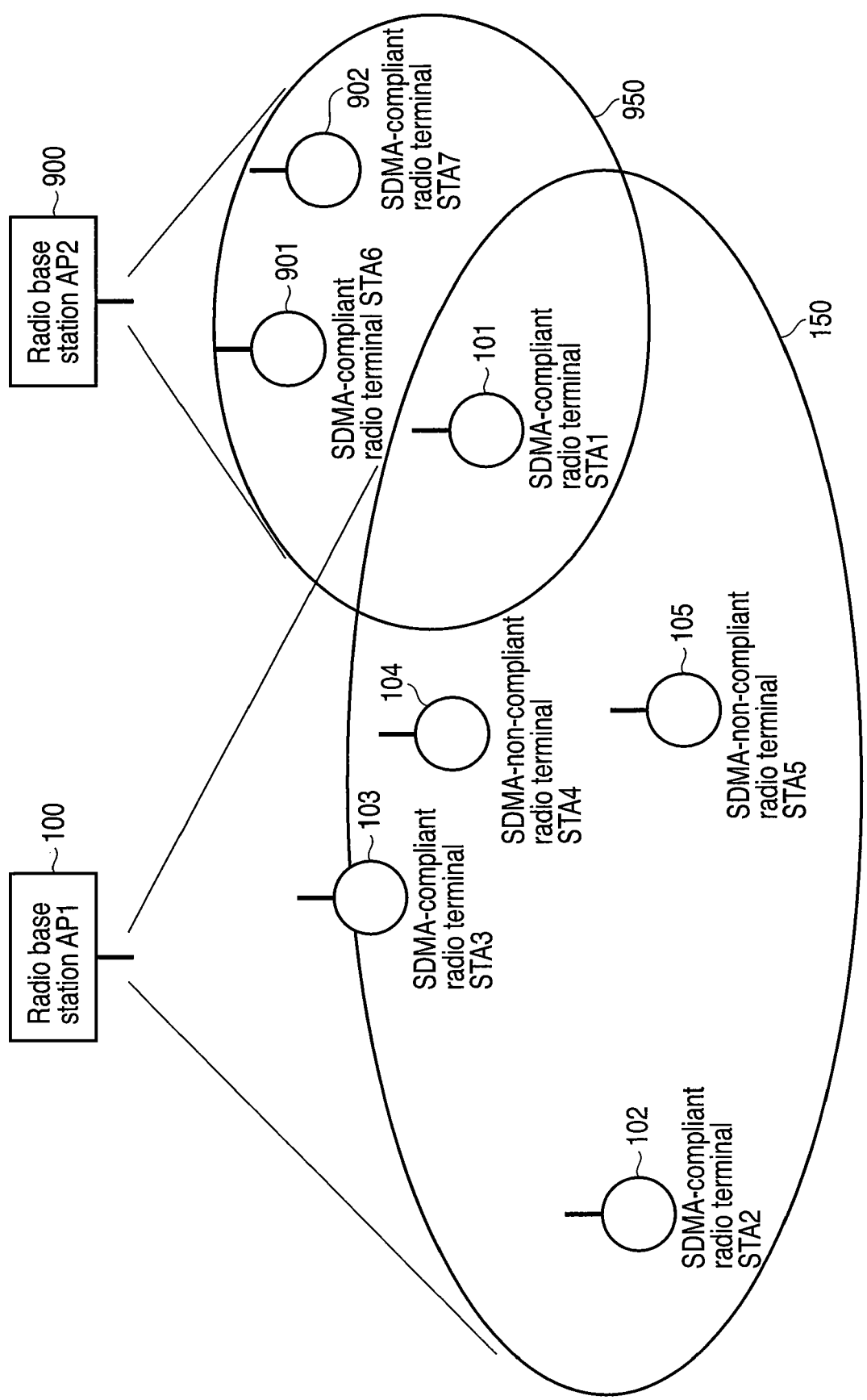
FIG. 9 is a view useful in explaining the advantage of the first embodiment.

Referring to FIG. 9, the advantage of the embodiment will be described.

As is shown in FIG. 9, assume that a plurality of radio base stations AP1 100 and AP2 900 form a network, radio terminals STA1 101 to STA5 105 belong to the base station AP1 100, and radio terminals STA6 901 to STA7 902 belong to the base station AP2 900. Assume further that the radio terminal STA1 101 is positioned at a position at which it can access both the radio base stations AP1 100 and AP2 900, and the radio base stations AP1 100 and AP2 900 are located at locations at which they cannot access each other. Normally, the radio base station AP1 100 sends a polling signal for allowing SDMA-scheme transmission to the radio terminals, without information concerning the transmission state of the radio base station AP2 900.

In the conventional radio system, upon receiving a polling signal, each radio terminal executes transmission without carrier sense. In contrast, in the embodiment, each radio terminal having received a polling signal executes transmission after executing carrier sense, and hence can avoid affecting influence on any adjacent network (in this case, the network of the radio base station AP2). There is a mechanism in which a concept of virtual carrier sense, such as IEEE802.11, is introduced, and transmission is inhibited for a preset period upon receiving a signal from the radio base station AP2 or from a radio terminal belonging thereto. If this mechanism is combined with the conventional polling system, transmission permission is imparted to a certain radio terminal since the conventional polling system employs the unicast transmission scheme. When this radio terminal is in a transmission inhibited state due to virtual carrier sense, it cannot execute transmission even if the radio base station AP1 allows it to execute spatial multiplex transmission. This is a waste of the polling signal.

In contrast, in the embodiment, since a polling signal is broadcasted, the radio base station AP1 does not have to know the transmission inhibited state of each radio terminal. Namely, since the embodiment is constructed such that transmission permission is imparted to all radio terminals that can execute SDMA-scheme transmission, and those of the radio terminals that are free from inhibition of execution of transmission due to virtual carrier sense can access the radio base station AP1, there is no waste of the polling signal. Further, if all radio terminals that are not inhibited from executing transmission access the radio base station AP1, it is possible that the maximum spatial multiple number will be exceeded. In light of this, the concept of backoff is introduced to appropriately control the number of radio terminals that simultaneously access the radio base station AP1.

Furthermore, in the first embodiment, backoff processing is not executed using a request for transmission as a trigger, which differs from conventional backoff processing. Instead, in the first embodiment, backoff is executed upon receiving a polling signal. As a result, radio terminals can start backoff processing at substantially the same time, the number of radio terminals that attempt to execute simultaneous transmission can be increased, and spatial division multiple transmission is enabled. Thus, the first embodiment is free from the problem of conventional backoff processing that the possibilities of simultaneous completion of backoff processing, simultaneous transmission of signals, and spatial multiplexing are very low since radio terminals start backoff processing at significantly different times.

As described above, in the embodiment, upon receiving a polling signal for allowing SDMA-scheme transmission using a broadcast address as the destination address information, a radio terminal assigns a random number for backoff to thereby reduce the possibility of the number of all radio terminals, which request transmission and attempt to simultaneously access a radio base station, exceeding the maximum spatial division multiple number. As a result, an appropriate number of radio terminals are enabled to simultaneously access the base station.

For instance, if a small number of radio terminals request transmission, the value of CW is reduced to increase the probability with which the same backoff period is obtained. If a large number of radio terminals request transmission, the value of CW is increased to reduce the probability with which the same backoff period is obtained. If the value of CW is frequently changed, it becomes complex to adjust CW to an appropriate value. However, if CW is changed at a relatively long interval, the efficiency of transmission can be enhanced by this simple method.

SECOND EMBODIMENT

Referring to FIGS. 10 and 11, a description will be given of an algorithm example used for switching the transmission scheme of a radio communication apparatus (STA1 101 to STA3 103), according to a second embodiment, between the SDMA scheme and a non-SDMA scheme. FIGS. 10 and 11 correspond to the first and second examples of the first embodiment, respectively. The radio communication apparatus of the second embodiment has the same structure as that of the first embodiment shown in FIG. 2.

As described above, in the first embodiment, after a polling signal for allowing the SDMA scheme transmission is received (step S603), carrier sense for determining whether SDMA scheme transmission is possible (step S607), and if it is determined that the transmission is possible over a preset period, frame transmission is executed using the SDMA scheme (step S610). In the second embodiment, when frame transmission is executed using the SDMA scheme upon receiving a polling signal, carrier sense for the SDMA scheme is not executed since frames transmitted by the SDMA scheme are not detected. Further, a preset period is measured by a counter determined using a random number, and frame transmission is executed using the SDMA scheme after the preset period elapses (step S610). During the preset period, however, only carrier sense for determining whether frame transmission is executed for the preset period using one of arbitrary schemes is executed (step S1001). If frame transmission using a scheme is detected during the preset period, it is determined that the transmission state has been shifted from the SDMA-scheme transmission allowable state to the SDMA-scheme transmission unallowable state (step S601). The other operations of the radio communication apparatus of the second embodiment are similar to those of the radio communication apparatus of the first embodiment.

In the SDMA scheme, a radio signal that can be spatially divided is transmitted. Therefore, even if, for example, a radio base station receives a radio signal during receiving a frame transmitted by the SDMA scheme, it can receive the frame correctly. In contrast, if the radio base station receives a radio signal during receiving a frame transmitted by a non-SDMA scheme, it may not receive the frame correctly. This being so, each radio terminal executes carrier sense during the aforementioned preset period for determining whether a frame is being transmitted by one of arbitrary schemes (step S1001), and carrier sense for determining whether a frame is being transmitted by the SDMA scheme is not executed. When carrier sense for determining whether a frame is being transmitted by the SDMA scheme, or carrier sense for observing the multiple number of transmission based on the SDMA scheme (step S607) is executed, a larger number of computations must be performed than the number of computations in normal receiving processing, thereby consuming a great amount of power. To reduce the consumption of power during carrier sense, the carrier sense for determining whether a frame is being transmitted by the SDMA scheme, or the carrier sense for observing the multiple number of transmission based on the SDMA scheme is not executed in the second embodiment.

In particular, the method of the second embodiment is advantageous if CW is set to a value higher than that set in the SDMA-scheme transmission allowable period after receiving a polling signal. For instance, assume that the SDMA-scheme transmission allowable period after receiving the polling signal is set to SIFS+SlotTime×10, and CW is set to 5. In this case, the radio terminal that has received the polling signal determines a backoff number using a random number. If the backoff number is greater than 5, SDMA scheme transmission responding to the polling signal is impossible. In contrast, all radio terminals that have backoff numbers not more than 5 can access the base station during the polling period. In light of this, it is advantageous if CW and the period for allowing SDMA scheme transmission are designed to make the number of terminals, which have backoff numbers not more than CW, less than the maximum spatial multiple number.

As described above, the embodiments provide radio communication systems using the SDMA scheme, wherein when receiving a polling signal for allowing SDMA-scheme transmission, which includes a broadcast address as the destination address information, radio terminals set their backoff numbers using random numbers, thereby reducing the number of computations for scheduling in a radio base station, and realizing fairer radio access without reducing the efficiency of transmission. In addition, the maximum delay time can be minimized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus comprising:
   a receiving unit configured to receive a first radio signal indicating a state in which transmission by a Space Division Multiple Access (SDMA) scheme is allowed;
   a first determination unit configured to determine, upon receiving the first radio signal, whether a transmission state is a first state in which transmission by the SDMA scheme is possible, or a second state in which the transmission by the SDMA scheme is impossible;

a second determination unit configured to determine whether the first state continues for a first time period;

a first transmission unit configured to transmit a radio signal using the SDMA scheme, when the second determination unit determines that the first state continues for the first time period; and a first setting unit configured to set a third time period instead of the first time period, when the second determination unit determines that the first state fails to continue for the first time period, the third time period being obtained by subtracting, from the first time period, a second time period ranging from when the carrier sense is started to when the transmission state is determined to be the second state, wherein when the receiving unit receives the first radio signal after the third time period is set, the second determination unit determines whether the first state continues for the third time period.

2. The apparatus according to claim 1, wherein when there is no radio signal from another radio communication apparatus, the first determination unit determines that the transmission state is the first state.

3. The apparatus according to claim 1, wherein when number of radio signals simultaneously transmitted by the SDMA scheme is less than a maximum spatial multiple number set in the SDMA scheme, the first determination unit determines that the transmission state is the first state.

4. The apparatus according to claim 1, wherein the receiving unit receives information indicating a fourth time period and included in the first radio signal, the fourth time period being a time period in which the transmission by the SDMA scheme is allowed, and further comprising a third determination unit configured to determine that the transmission state has been shifted to the second state when the first state continues for a time period longer than the fourth time period.

5. The apparatus according to claim 1, further comprising:
a fourth determination unit configured to determine whether the transmission state is a third state in which transmission by a non-SDMA scheme is possible, or a fourth state in which transmission by the non-SDMA scheme is impossible;

a fifth determination unit configured to determine whether the third state continues for a fifth time period;

a second transmission unit configured to transmit a radio signal using a non-SDMA scheme, when the fifth determination unit determines that the third state continues for the fifth time period;

a second setting unit configured to set a seventh time period instead of the fifth time period, when the fifth determination unit determines that the third state fails to continue for the fifth time period, the seventh time period being obtained by subtracting, from the fifth time period, a sixth time period ranging from when the carrier sense is started to when the transmission state is determined to be the fourth state, wherein after the seventh time period is set, the fifth determination unit determines whether the third state continues for the seventh time period.

6. A radio communication apparatus comprising:
a receiving unit configured to receive a first radio signal indicating a state in which transmission by a Space Division Multiple Access (SDMA) scheme is allowed;

a first determination unit configured to determine, upon receiving the first radio signal, whether a transmission state is a first state in which there are no radio signals of arbitrary communication schemes, or a second state in which there is a radio signal of a communication scheme;

a second determination unit configured to determine whether the first state continues for a first time period;

a first transmission unit configured to transmit a radio signal using the SDMA scheme, when the second determination unit determines that the first state continues for the first time period; and a first setting unit configured to set a third time period instead of the first time period, when the second determination unit determines that the first state fails to continue for the first time period, the third time period being obtained by subtracting, from the first time period, a second time period ranging from when the carrier sense is started to when the transmission state is determined to be the second state, wherein when the receiving unit receives the first radio signal after the third time period is set, the second determination unit determines whether the first state continues for the third time period.

7. The apparatus according to claim 6, wherein when the first determination unit determines that the transmission state is the second state, the second determination unit determines that the transmission state has been shifted from the state in which the transmission by the SDMA scheme is possible, to a state in which the transmission by the SDMA scheme is impossible.

8. A radio communication apparatus comprising:
an estimation unit configured to estimate number of first radio communication apparatuses having requests for transmission and included in second radio communication apparatuses, when the second radio communication apparatuses receive a first radio signal indicating a state in which transmission by a Space Division Multiple Access (SDMA) scheme is allowed;

a setting unit configured to set an upper limit of a random number generated by each of the first radio communication apparatuses when each first radio communication apparatus computes a carrier sense time period, the larger the random number, the longer the carrier sense time period, the upper limit being set to cause a product of the number of the first radio communication apparatuses and an inverse number of the upper limit to be smaller than a maximum spatial multiple number determined in the SDMA scheme by a value falling within a threshold value range; and a transmission unit configured to transmit the first radio signal including the upper limit to third radio communication apparatuses belonging to a network and including the first radio communication apparatuses.

9. The apparatus according to claim 8, wherein the estimation unit estimates the number of the first radio communication apparatuses based on number of the third radio communication apparatuses belonging to the network.

10. A method of using a radio communication apparatus, comprising:
receiving a first radio signal indicating a state in which transmission by a Space Division Multiple Access (SDMA) scheme is allowed;

determining, upon receiving the first radio signal, whether a transmission state is a first state in which transmission by the SDMA scheme is possible, or a second state in which the transmission by the SDMA scheme is impossible;

determining whether the first state continues for a first time period;

transmitting a radio signal using the SDMA scheme, when it is determined that the first state continues for the first time period;

setting a third time period instead of the first time period, when it is determined that the first state fails to continue for the first time period, the third time period being obtained by subtracting, from the first time period, a second time period ranging from when the carrier sense is started to when the transmission state is determined to be the second state; and determining whether the first state continues for the third time period, when receiving the first radio signal after setting the third time period.

11. A method of using a radio communication apparatus, comprising:

receiving a first radio signal indicating a state in which transmission by a Space Division Multiple Access (SDMA) scheme is allowed;

determining, upon receiving the first radio signal, whether a transmission state is a first state in which there are no radio signals of arbitrary communication schemes, or a second state in which there is a radio signal of a communication scheme;

determining whether the first state continues for a first time period;

transmitting a radio signal using the SDMA scheme, when it is determined that the first state continues for the first time period;

setting a third time period instead of the first time period, when it is determined that the first state fails to continue for the first time period, the third time period being obtained by subtracting, from the first time period, a second time period ranging from when the carrier sense is started to when the transmission state is determined to be the second state; and determining whether the first state continues for the third time period, when receiving the first radio signal after setting the third time period.

12. A method of using a radio communication apparatus, comprising:

estimating number of first radio communication apparatuses having requests for transmission and included in second radio communication apparatuses, when the second radio communication apparatuses receive a first radio signal indicating a state in which transmission by a Space Division Multiple Access (SDMA) scheme is allowed;

setting an upper limit of a random number generated by each of the first radio communication apparatuses when each first radio communication apparatus computes a carrier sense time period, the larger the random number, the longer the carrier sense time period, the upper limit being set to cause a product of the number of the first radio communication apparatuses and an inverse number of the upper limit to be smaller than a maximum spatial multiple number determined in the SDMA scheme by a value falling within a threshold value range; and transmitting the first radio signal including the upper limit to third radio communication apparatuses belonging to a network and including the first radio communication apparatuses.

* * * * *